Dec. 30, 1969  G. LANGE  3,486,372
MACHINE FOR STRETCHING AND TESTING CHAIN LINKS
Filed Nov. 17, 1967
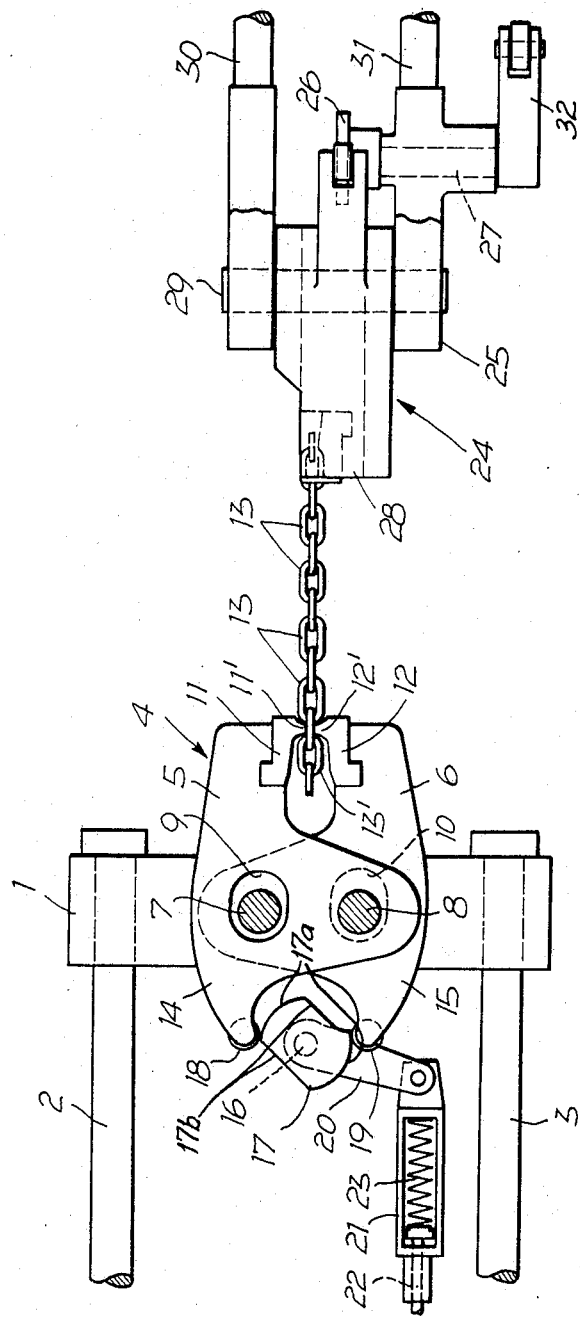
Inventor:
Gerhard LANGE
by: Arthur O. Klein
his Attorney United States Patent Office 3,486,372
Patented Dec. 30, 1969

3,486,372
MACHINE FOR STRETCHING AND TESTING CHAIN LINKS
Gerhard Lange, Reutlingen, Baden-Wurttemberg, Germany, assignor to Wafios Maschinenfabrik Wagner, Ficker & Schmid, Reutlingen, Germany, a corporation
Filed Nov. 17, 1967, Ser. No. 683,997
Claims priority, application Germany, Dec. 6, 1966, W 42,913
Int. Cl. G01n 3/08
U.S. Cl. 73—103                                6 Claims

ABSTRACT OF THE DISCLOSURE

A machine for stretching and testing chain links, comprising two sets of tongs for gripping the first and last links of a chain section, which are movable in the longitudinal direction with respect to each other and wherein the two arms of one set of tongs are pivotable relative to each other within a plane which is turned about a common longitudinal axis substantially at an angle of 90° to the plane of the pivoting movement of the other set of tongs.

---

The present invention relates to a machine for stretching and testing chain links which comprises two sets of tongs which are movable relative to each other in the longitudinal direction of the chain and each of which comprises a pair of gripping jaws for gripping the first and last link, respectively, of the chain section which is to be stretched and tested.

The prior art relating to similar apparatuses discloses a device in which the first and last link of the chain section to be stretched and tested are slipped over a pair of pins or the like which extend parallel to each other. Therefore, if the first link is slipped over one of the pins, the second pin can only receive the third, fifth, seventh or other odd-number link, since the intermediate links are turned at an angle of 90° to the plane of the first link. If the pins extend, for example, in vertical directions, only those links can be applied thereon which are located within a horizontal plane. Since every individual link should be stretched and tested and none should be omitted, the chain may—after one section has been tested— be advanced only to such an extent that the link which was previously applied upon the first pin will not be applied upon the second pin. The first pin then again holds an odd-numbered link counted from the link which is held on the second pin. It is thus unavoidable that those links through which the pins engage will be stretched twice which, of course, is a considerable disadvantage.

The same disadvantage results when any of the other known apparatus are employed in which the chain links are gripped by tongs instead of being held by pins.

It is an object of the present invention to provide a machine of the type first mentioned above which is designed so that each chain link will be stretched only once. According to the invention this object is attained in an extremely simple manner by mounting the tongs so that the plane of the pivoting movement of the jaws of one set of tongs is turned at an angle of 90° to the plane of the pivoting movement of the jaws of the second set of tongs. After one section of the chain has been tested by this machine, the rear tongs as seen in the direction of movement of the chain will then grip the first untested chain link which is directly adjacent to the last link which has previously been tested and stretched.

One advantageous feature of the invention consists in making the free end of each jaw of a hook-shaped design and to provide its inner side with a contact surface which has a curvature equal to the curvature of the chain links. This permits the chain links to be embraced by the tongs on their outer sides so that practically one half of each link will be fully embedded in the tong jaws.

For absolutely preventing the tongs from opening during the stretching operation, the center of rotation of each jaw and its free end are provided at different sides of the longitudinal axis of the chain section which is clamped between the two tongs. By placing the center of rotation of each jaw in such a position, the advantage is attained that a traction which is exerted upon the chain will produce a torque upon the jaws which tends to close the tongs.

Another advantageous feature of the invention consists in providing a cam member for opening and closing the two tong levers of each set of tongs and in connecting this cam member to a driving mechanism through an element which limits the force to be applied by this mechanism upon the cam member. This intermediate element which is preferably resilient prevents the tongs from breaking when the chain link which is gripped thereby is not located in the proper position within the tong jaws and therefore prevents the jaws from closing.

The features and advantages of the present invention will become more clearly apparent from the following detailed description thereof which is to be read with reference to the accompanying drawing which shows a side view of the essential parts of the apparatus.

As illustrated in the drawing, the apparatus according to the invention comprises a yoke 1 the opposite ends of which are secured to two parellel supporting rods 2 and 3. This yoke 1 carries a first set of tongs 4 the two jaws 5 and 6 of which are pivotably mounted on pivot pins 7 and 8 which are secured to the yoke 1 at a suitable distance from each other.

Each of the jaws 5 and 6 has an angular shape. The longitudinal arms of these jaws extend substantially parallel to each other, while the two transverse arms overlap each other and their free ends are pivotably mounted on the respective pivot pin 7 or 8. Each jaw 5 and 6 is provided with an aperture 9 or 10, respectively, through which the pivot pin 7 or 8 extends on which the other jaw is mounted.

The free ends 11 and 12 of jaws 5 and 6 are provided in the form of hooks and the inner side of each hook is provided with a contact surface 11' or 12' which is curved in accordance with the curvature of the chain links 13. These hooks 11 and 12 preferably form separate elements which are removably inserted into the jaws 5 and 6 so as to permit them to be exchanged for others when the machine is to be employed for testing chains of different sizes.

Each jaw 5 and 6 is integral with a tong lever 14 or 15, respectively, which extends substantially in the longitudinal direction of the associated jaw carrying the hook. Each of the two tong members is therefore substantially T-shaped and the tongs as a whole have substantially the shape of an H, wherein the crossbar of the H is formed by the two superimposed cross arms of the jaws 5 and 6 the free ends of which are pivotably mounted on the pivot pins 7 and 8.

Within the opening which is formed between the rear ends of the tong levers 14 and 15 a cam disk 17 is rigidly secured to a pivot pin 16 the axis of which extends parallel to the axes of the pivot pins 7 and 8. The cam disk 17 has two opposite curved cam surfaces 17a and two opposite flat cam surfaces 17b, as illustrated in the sole figure of the drawing. These cam surfaces of this cam disk 17 are engaged by the rollers 18 and 19 which are rotatably mounted on the free rear ends of the levers 14 and 15. Levers 14 and 15 are connected to biasing means, such as for example a coil spring (not shown), which urges them to move toward each other. Cam disk 17 is rigidly secured to one end of the pivot pin 16, the other end of which is rigidly secured to an arm 20. The cam disk 17 may also be directly rigidly connected to the arm 20 and the aforementioned elements may be jointly rotatably mounted on the pivot pin 16. The other end of the arm 20 is pivotably connected to an element 21 in the form of a cylinder in which a drive rod 22 is slidably mounted back and forth in the axial direction and adapted to act upon a coil spring 23. When this drive rod 22 is shifted in the direction toward the tongs and the cam follower rollers 18 and 19, the latter move over the flat cam surfaces 17b to the curved cam surfaces 17a, thereby enlarging the space between the rear ends of the tong levers 14 and 15 so as to close the tongs 4, which causes the coil spring 23 to be compressed.

The second set of tongs 24 which is spaced from the first set 4 and is in axial alignment with the longitudinal axis of the tongs 4 is substantially of the same construction as the tongs 4 but its jaws are pivotable within a plane which is turned at an angle of 90° relative to the plane within which the jaws of the tongs 4 are pivotable. Of the two jaws of tongs 24 only the jaw 28 is illustrated which is pivotably mounted on a pivot pin 29 on the yoke 25. This yoke carrying the tongs 24 is of a slightly different shape from that of yoke 1 which, however, is of no importance insofar as the invention is concerned. Tongs 24 are opened and closed in the same manner as tongs 4 by means of a cam disk 26 which is secured to a shaft 27 which is rigidly connected to an arm 32 corresponding to the arm 20 of tongs 4.

Tongs 24 are guided by a slide carriage, not shown, and may be moved by connecting rods 30 and 31 in the longitudinal direction of the chain by means of an eccentric, likewise not shown.

The mode of operation of the apparatus according to the invention is as follows:

The chain consisting of the links 13 is fed on a guide rail, not shown, to the two sets of tongs 4 and 24 by means of an adjustable feeding mechanism. Since such guide rails and feeding mechanisms are well known in this art, they are not illustrated in the drawing. As soon as the chain section which is to be stretched and tested has been placed between the tongs 4 and 24, both sets of tongs are closed. The hooks on the jaws of tongs 4 then engage into a horizontal chain link 13 and those on the jaws of tongs 24 into a vertical chain link 13 and they embrace the outside of approximately one half of each of these links which are directly adjacent to the chain section to be tested. If chain link 13 which is to be gripped is not located in the proper position, for example, between the jaws 5 and 6 and the tongs 4 therefore cannot be closed, the coil spring 23 will prevent the hooks 11 and 12 as well as the other force transmitting parts including the drive rod 22 from being damaged or broken.

As illustrated in the drawing, a suitable number of chain links 13 is always stretched and tested simultaneously which is accomplished by moving the tongs 24 away from the tongs 4. Since the fulcrum and the hook of each jaw are located at the opposite sides of the longitudinal axis of the tongs, the traction which is exerted upon the chain will also produce a torque which tends to close the tongs and prevents them from opening during the stretching operation.

Each chain to be tested is generally stretched to a predetermined length and the force which is required for this purpose is indicated by a gauge which measures the traction which occurs between the rods 2 and 3 and the machine body and which may also be recorded on a tape by an additional instrument. The diagram which is thus drawn indicates the degree of stability of the chain. Each chain link tested and found to be in order is then automatically stamped by the machine.

After one chain section has been stretched and tested, the two tongs 4 and 24 are opened and the chain is fed forwardly for such a distance that the hooks of tongs 24 will engage into the next chain link 13' which has not as yet been stretched. Consequently, no chain link will be stretched twice.

Although my invention has been illustrated and described with reference to the preferred embodiment thereof, I wish to have it understood that it is in no way limited to the details of such embodiment but is capable of numerous modifications within the scope of the invention.

Having thus fully disclosed by invention, what I claim is:

1. In a machine for stretching and testing chain links comprising two sets of tongs for gripping the first and last links of a chain section to be stretched and tested, said two sets of tongs being movable relative to each other in the longitudinal direction of said chain section and each set comprising two levers each having two ends and a clamping jaw on one end of each lever, and means for pivoting said two levers relative to each other within a plane disposed at an angle of substantially 90° to the plane within which said levers of the other set of tongs are pivotable.

2. A machine as defined in claim 1, wherein each clamping jaw forms a hook-shaped gripping part which is provided on its inner side with a contact surface which is curved in accordance with the curvature of the chain links to be stretched and tested.

3. A machine as defined in claim 2, wherein each clamping jaw forms an element separate from the associated lever and is removably connected to one end of said lever.

4. A machine as defined in claim 1, wherein the fulcrum and the clamping jaw of each lever of each set of tongs are disposed at the opposite sides of the longitudinal axis of the chain section to be clamped between the two sets of tongs.

5. A machine as defined in claim 1, wherein said means for pivoting said two levers of each set of tongs relative to each other comprise a cam disk interposed between the other ends of said levers, driving means for turning said cam disk about its axis, and transmitting means interposed between said driving means and said cam disk for limiting the force to be applied by said driving means upon said cam disk.

6. A machine as defined in claim 5, wherein said transmitting means comprise spring means.

References Cited

UNITED STATES PATENTS

| 466,911 | 1/1892 | Salisbury | 254—74 |
| 1,033,531 | 7/1912 | Brown. | |
| 1,198,329 | 9/1916 | Spencer. | |
| 1,255,936 | 2/1918 | Scott | 24—250 |
| 2,341,465 | 2/1944 | Monnot | 24—250 |
| 2,380,990 | 8/1945 | Paul. | |
| 2,600,923 | 6/1952 | Rogers | 73—103 |

FOREIGN PATENTS

| 924,242 | 2/1955 | Germany. |
| 879 | 3/1879 | Great Britain. |
| 891,687 | 3/1962 | Great Britain. |

BERNARD A. GELAK, Primary Examiner

U.S. Cl. X.R.

24—116, 250; 73—95; 254—74